United States Patent [19]

Kulig et al.

[11] 4,089,663

[45] May 16, 1978

[54] PULSATION AND NOISE SUPPRESSOR ASSEMBLY WITH AIR FILTER

[75] Inventors: Stanislaw Kulig; Andrzej Góral; Wlodzimierz Surkow; Andrzej Szczepanik; Edward Szulaczewski, all of Cracow, Poland

[73] Assignee: Cebea Osrodek Badawczo-Rozwojowy Przemyslu Budowy Urzadzen Chemicznych, Cracow, Poland

[21] Appl. No.: 676,973

[22] Filed: Apr. 14, 1976

[30] Foreign Application Priority Data

Apr. 19, 1975 Poland ................................ 179782

[51] Int. Cl.² ............................................ B01D 46/00

[52] U.S. Cl. ........................................ 55/276; 55/484; 55/DIG. 21; 181/229

[58] Field of Search ................. 55/276, 484, DIG. 21; 181/40, 50, 55, 57, 35 A, 35 R

[56] References Cited

U.S. PATENT DOCUMENTS

| | | | |
|---|---|---|---|
| 1,045,419 | 11/1912 | Matula | 181/55 |
| 2,050,581 | 8/1936 | Orem | 55/276 |
| 2,564,819 | 8/1951 | Perrin | 55/276 |

*Primary Examiner*—Bernard Nozick
*Attorney, Agent, or Firm*—Haseltine, Lake & Waters

[57] ABSTRACT

A pulsation and noise suppressor assembly with an air filter intended for an induction system in thermodynamic engines. A tubular housing with at least one bracket connecting a filter and its shield to a suppression cartridge unit. Inside the housing is a replaceable cartridge for suppressing pulsations and noise, the latter consisting of minimum one tube with optionally shaped holes made in the tube walls and arranged in rows along the tube generating lines with angular displacement each to another. The holes connecting a tube interior to the outer space. The cartridge tubes are eccentric to each other forming at least two chambers for suppressing noise and pulsation. Each tube wall thickness is proportional to the tube diameter, and each chamber volume is larger than that of the adjacent chamber from its internal side, the cross-section area of the holes being advantageously proportional to the tube diameter.

8 Claims, 3 Drawing Figures

PULSATION AND NOISE SUPPRESSOR ASSEMBLY WITH AIR FILTER

BACKGROUND OF INVENTION

This invention is directed to a pulsation and noise suppressor assembly employing an complete with air filter, the apparatus being intended for an induction system with thermodynamic engines, especially compressors, consisting of a chamber suppressor of pulsation and noise, and employing a filter element wrapped with fibre material layers of good filtering and damping properties.

Known are prior art designs of pulsation and noise suppressor assemblies with filters for induction systems of compressors, are designed so that the filter is lodged in one housing, and the pulsation and noise suppressor is a self-contained unit being arranged within a separate housing. Such a design, however, has disadvantages relating to the manufacturing process, high material and labour consumption, as well as laborious servicing and operation. Also design known are filter is shortcomings were the combined with the pulsation and noise suppressor so that the filter has no casing. This is disadvantageous because the filter is liable to be a damaged when in transit or operation. Moreover, all the existing designs of filter assemblies with the pulsation and noise suppressor have baffle plates dividing them into chambers integrally connected with the suppressor casing, which impede or even preclude its interior regeneration, especially cleaning and rust prevention. Besides, the existing designs often show leakage between the assembly chambers and its surroundings thus causing contamination to the compressor working space and badly affecting the life of machine mating parts. In addition life. The overall dimensions of the compressor have to be increased and suction of air from the immediate environment of cylinders takes place thus decreasing compressor efficiency. The existing assemblies of filter with the pulsation and noise suppressor are made of metal, which causes the assembly to come into resonant vibration and higher noise.

SUMMARY OF INVENTION

According to this invention, the important components of the filter assembly complete with the pulsation and noise suppressor are disposed within a common housing made of non-metallic flexible material. The housing contains a replaceable supression arrangement consisting of at least one eccentric tube, which forms the pulsation damping chambers and thus the noise suppressing cushions, where each tube wall thickness — affecting noise suppression — is proportional to the tube diameter. The cartridge tube walls are provided with holes to connect the tube inner and outer spaces and are arranged in rows over the tube generating lines. The rows of the ports in particular tubes have an angular displacement with respect to one another, thus offering the most advantageous routing for air to be filtered. As a result the suppresion ability and simulteneous precipitation of condensate and impurities which penetrated throughout the filter are improved. Advantageous conditions for suppression and effective filtration are attained by continuously changing cross-section area of air flow passages in suppressing chambers.

Also within the scope of the invention are the following relationships which take plate at a time when the supression unit is arranged inside the housing:

$$v_1 > v_2 > v_n$$

$$g_1 > g_2 > g_n$$

$$f_1 > f_2 > f_n$$

where:

$v_1, v_2 \ldots v_n$ — capacities of suppressing chambers $f_1, f_2 \ldots f_n$ — wall thickness of tubes the above relationship being denoted in sequence from the housing towards the unit centre.

Also according to the invention, the assembly housing is longer than the suppression unit and has one end closed with a the suppression unit face wall, and the other with a cover plate, while the housing from at least one end, extends over the face wall external surface. In the case of assembly with two filters, its housing will be closed at both ends with the face walls. Seals are provided between the cartridge face walls and the housing. The suppression unit face walls are affixed to a bracket for retaining a coarse filter and to mount a shielding. A diffuser is provided within the coarse filter inner space, leading to the most internal suppression chamber of the cartridge unit. The assembly flank is provided with suction stub pipes or holes, or a suction hole and decompression hole, connecting other spaces, especially in the compressor, where air pressure pulsation is encountered, to the suppressing chamber.

According to this invention, assembly of the air filter with the noise and pulsation suppressor ensures high efficiency of filtration, thus contributing to extended service life of the mating parts and units in thermodynamic engines such as compressors in particular.

The main object of the invention is to overcome the defects of the prior art.

Another object of this invention is to optimize the design, operating efficiency and maintenance of the filter assembly with a pulsation and noise suppressor by effective filtering of air and decreased dimensions and weight.

Other objects and advantages will be more readily understood with respect to the accompanying specification, claims and drawings.

PREFERRED EMBODIMENT OF INVENTION

Figure 1:
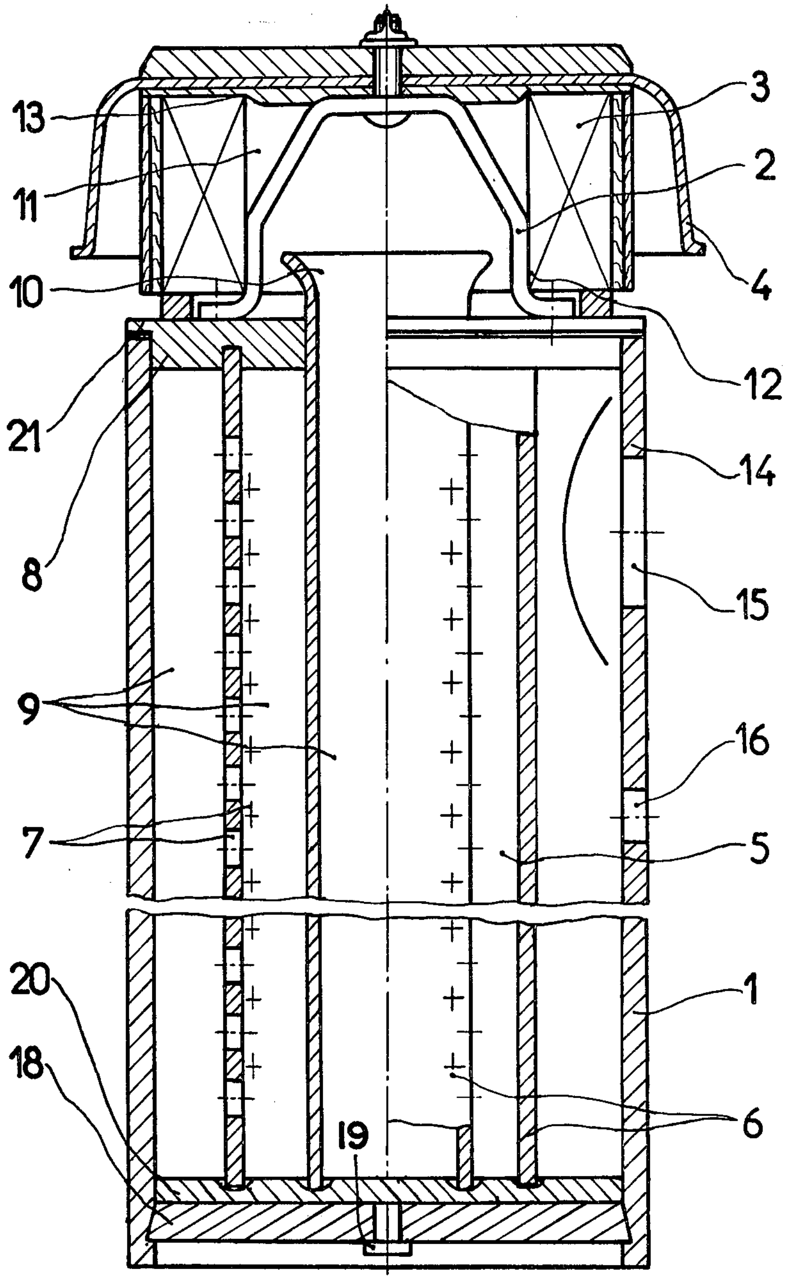
FIG. 1 shows a pulsation and noise suppressor with air filter to be mounted upon a one cylinder unit, in longitudinal section taken in the cutting plane through the section hole centre line.
Figure 2:
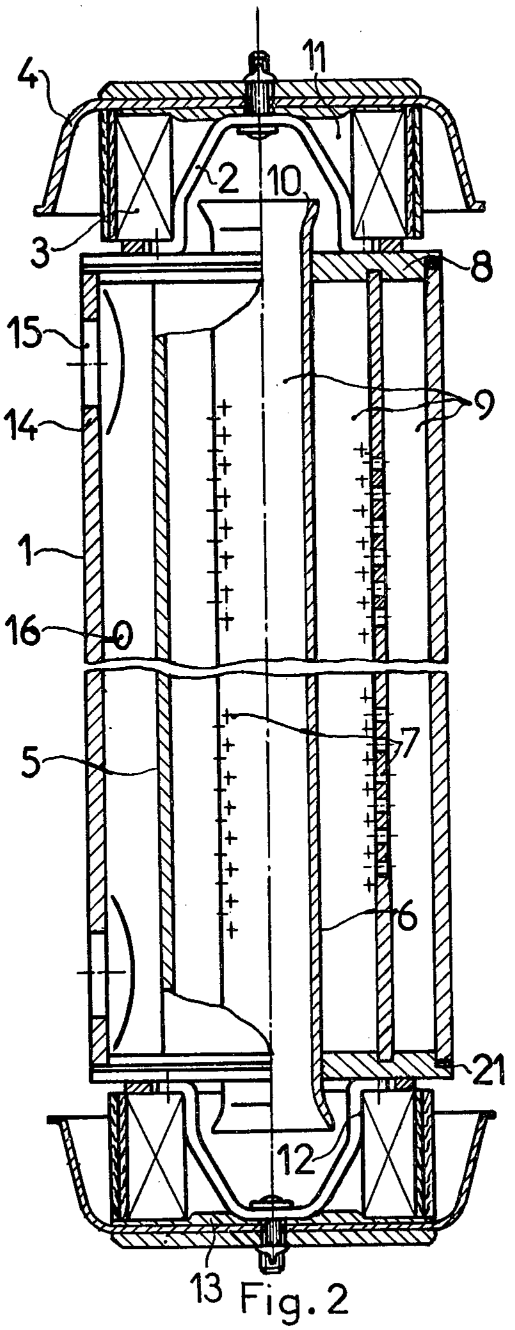
FIG. 2 shows the assembly designed for mounting on at least two cylinder units, its longitudinal section through the centre line of minimum two suction holes.
Figure 3:
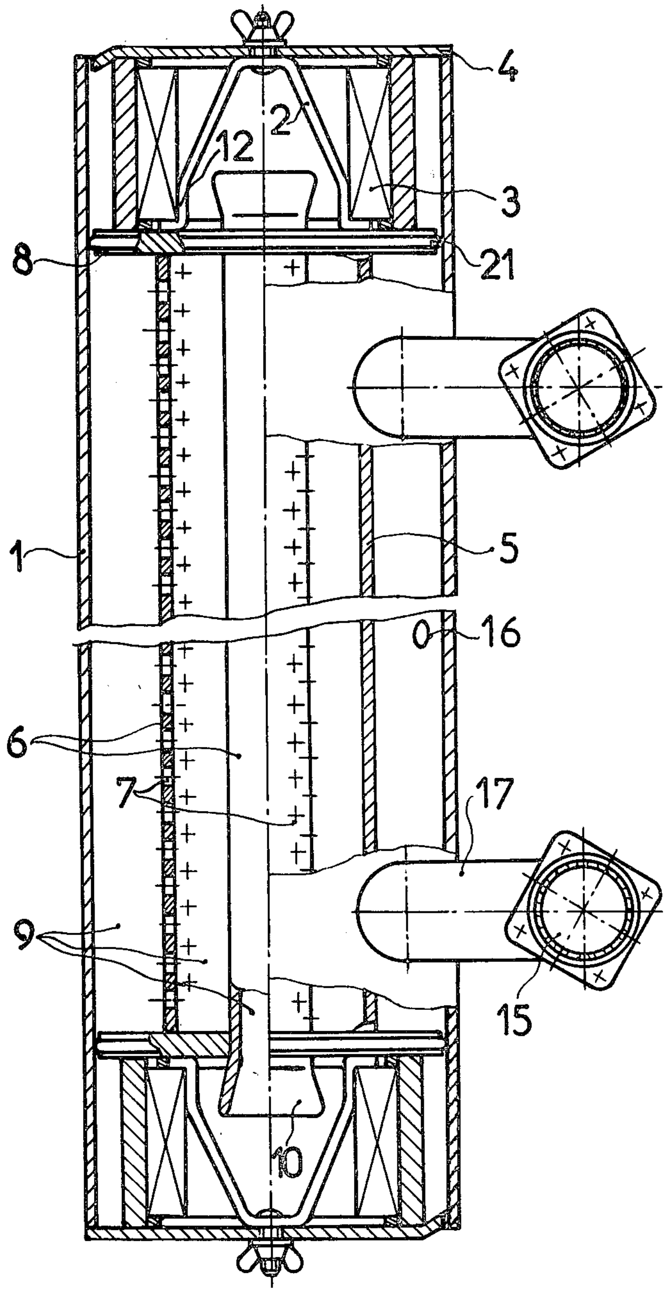
FIG. 3 shows the assembly design with suction stub pipes in its longitudinal sectional view taken through the suppressor centre line.

The bracket 2 is fastened to the suppression cartridge 5 face wall 8 closing tubular housing 1 to retain with its faying faces 12 a filter 3 and insulating pad 13 complete with a shield 4. The face wall 8 has a hole to mount a diffuser 10 lodged in inner space 11 of filter 3 and leading to the supression chambers 9 formed by the tubes 6 of the suppression cartridge 5.

Optionally shaped holes 7 are made through walls of the tubes 6. The housing 1 wall has flat faying faces 14 with suction holes 15, or the flat faying face 14 with the suction hole 15 and the decompression hole 16, or the stub pipes 17. The housing 1 is closed with two face walls 8, or with the face wall 8 and the cover plate 18. Plugged port 19 is intended for draining of condensate. An insulating and suppressing pad 20 is provided between the ends of the suppressing cartridge 5 tubes 6. Packing 21 is fitted between the housing 1 and the suppression cartridge 5 face walls 8.

Compared to the existing designs, this assembly features reduced overall dimensions and lower weight. Due to ease of stripping and reassembly of sub-assembies, inspection and regeneration of internal surfaces of the housing and suppression cartridge unit become quite convenient. The design according to this invention will prevent damage to the assembly when in transit or service. Application of non-metallic materials for the assembly housing and the suppression unit not only improve the assembly suppression abilities, but also eliminate the need for anti-corrosion protections, especially in chemically active surroundings. Eccentricity of the cartridge tubes causes a continuously changing cross-sectional area of air flow passages in the suppression chambers and the holes in the suppression unit tubes. As a result, effective suppression of noise is attained.

We claim:

1. A pulsation and noise suppressor apparatus having an air filter provided with air intake and outlet means, said apparatus being used with an induction system of thermodynamic engines, especially that of compressors, containing a noise and a pulsation suppression chamber with a precleaning filter wrapped in a layer of filter fibre material, said apparatus including: a housing formed of flexible non-metallic material provided with a suction outlet formed therewith, a bracket means for affixing the filter and its casing to a replaceable suppression cartridge means located inside the housing; face walls disposed at opposite ends thereof for closing said housing, said cartridge being formed of non-metallic material defined by a plurality of tubes one within the other in said housing each having holes associated therewith, which connect an inner space of said respective tubes to that outside of said tubes, said tubes being respectively further defined by said face walls and being eccentrically arranged with respect to each other to form at least two chambers for the suppression of pulsation and noise, the inner of said tubes projecting through a face wall adjacent the filter and its casing each of said tubes having a wall thickness proportional to the tube diameter, and the volume of each chamber being larger than that of an adjacent chamber; the cross-sectional area of the holes in the walls of tubes being proportional to the diameter of the tubes, and diffuser means affixed to the face wall, for connecting the suppression chamber to the inner space of said filter.

2. An apparatus as claimed in claim 1, wherein: the holes are situated in rows along generating lines of the tubes, with angular displacement between the rows of the holes in particular tubes.

3. An apparatus as claimed in claim 1, wherein: bracket means are provided inside the filter inner space and has a faying face to retain the filter positioned against the diffuser, and an insulating pad fitted between the bracket and the shield.

4. An apparatus as claimed in claim 1, wherein: the housing has on its flank at least one flat faying face with a suction hole and at least one decompressing hole.

5. An apparatus as claimed in claim 1, wherein: the housing is provided with at least two stub pipes.

6. An apparatus as claimed in claim 1, wherein: the housing is longer than the suppression on cartridge, and at one end being extended beyond the external plane of the face wall.

7. An apparatus as claimed in claim 1, wherein: the housing is closed at one end with the suppression cartridge face wall, and is permanently closed by the cover plate provided with the plugged hole at the opposite end, an insulation and suppression flexible pad being fitted between the said cover plate and suppression cartridge tubes.

8. An apparatus as claimed in claim 1, wherein: packing is provided between edges of the suppression cartridge face wall and the housing.

* * * * *